(12) United States Patent
Yoneyama

(10) Patent No.: US 7,949,795 B2
(45) Date of Patent: May 24, 2011

(54) POWER CONSERVATION IN DATA STORAGE DEVICE BY ONLY STARTING THE ACTIVE STATE WHEN THE MEASURED TIME INDICATES DATA IS PRESENT ON THE INTERFACE

(75) Inventor: Koji Yoneyama, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 175 days.

(21) Appl. No.: 12/399,640

(22) Filed: Mar. 6, 2009

(65) Prior Publication Data
US 2009/0240839 A1    Sep. 24, 2009

(30) Foreign Application Priority Data

Mar. 19, 2008    (JP) .................. 2008-071068

(51) Int. Cl.
*G06F 3/00* (2006.01)
*G06F 1/00* (2006.01)
(52) U.S. Cl. .......................................... 710/5; 713/330
(58) Field of Classification Search ....... 710/5; 713/330
See application file for complete search history.

(56) References Cited

U.S. PATENT DOCUMENTS

| | | | |
|---|---|---|---|
| 5,809,224 A * | 9/1998 | Schultz et al. ................. 714/7 |
| 7,373,460 B2 | 5/2008 | Kobayashi et al. | |
| 2002/0029354 A1 * | 3/2002 | Forehand et al. ............. 713/340 |
| 2002/0147861 A1 * | 10/2002 | Bui et al. ...................... 710/1 |
| 2003/0041214 A1 * | 2/2003 | Hirao et al. ................... 711/137 |
| 2003/0126158 A1 * | 7/2003 | Chainer et al. ............... 707/200 |
| 2006/0095801 A1 * | 5/2006 | Penning et al. ............... 713/320 |
| 2006/0101174 A1 | 5/2006 | Kanamaru et al. | |
| 2006/0129703 A1 | 6/2006 | Oshikawa et al. | |
| 2006/0271739 A1 * | 11/2006 | Tsai et al. ..................... 711/123 |
| 2008/0072090 A1 * | 3/2008 | O'Connor et al. ............ 713/330 |
| 2009/0097150 A1 * | 4/2009 | Heise et al. .................. 360/73.01 |
| 2009/0217065 A1 * | 8/2009 | Araujo, Jr. .................... 713/320 |

FOREIGN PATENT DOCUMENTS

| | | |
|---|---|---|
| JP | A 2006-139459 | 6/2006 |
| JP | A 2006-139548 | 6/2006 |
| JP | A 2006-164012 | 6/2006 |

* cited by examiner

*Primary Examiner* — Henry W Tsai
*Assistant Examiner* — Hyun Nam
(74) *Attorney, Agent, or Firm* — Greer, Burns & Crain, Ltd.

(57) ABSTRACT

A storage device for storing data includes: an interface controller connectable to a host via a interface, the interface controller having an active state capable of transmitting data to the host and an inactive state having a lower power consumption than the active state; a medium for storing data; a head for read out data stored in the medium; and a processor for executing a process including receiving a command for reading out data stored in the medium from the host, determining timing when the data read out from the medium reaches the interface controller, and starting transition of the interface controller from the inactive state into the active state before the determined timing.

2 Claims, 17 Drawing Sheets

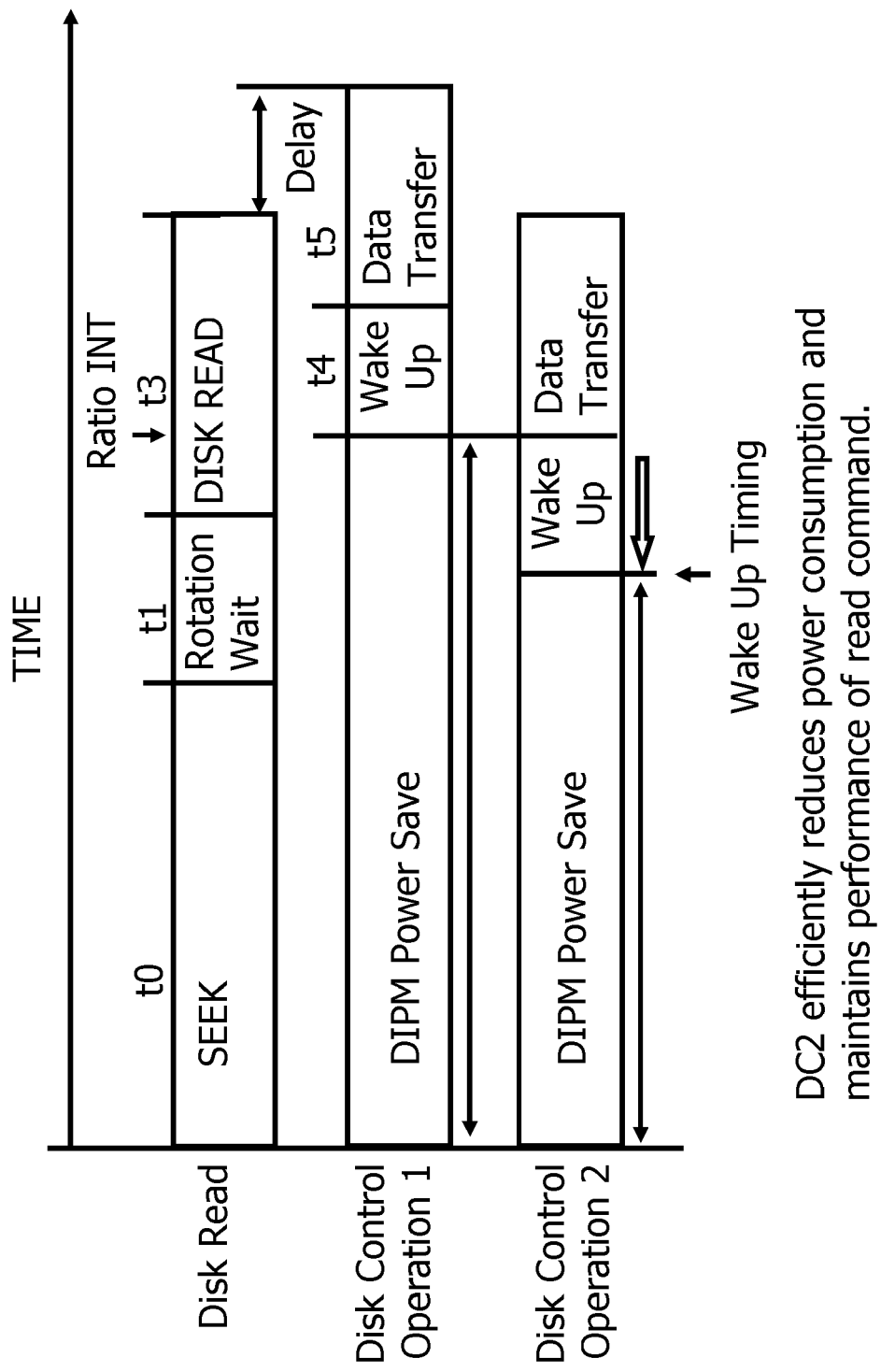

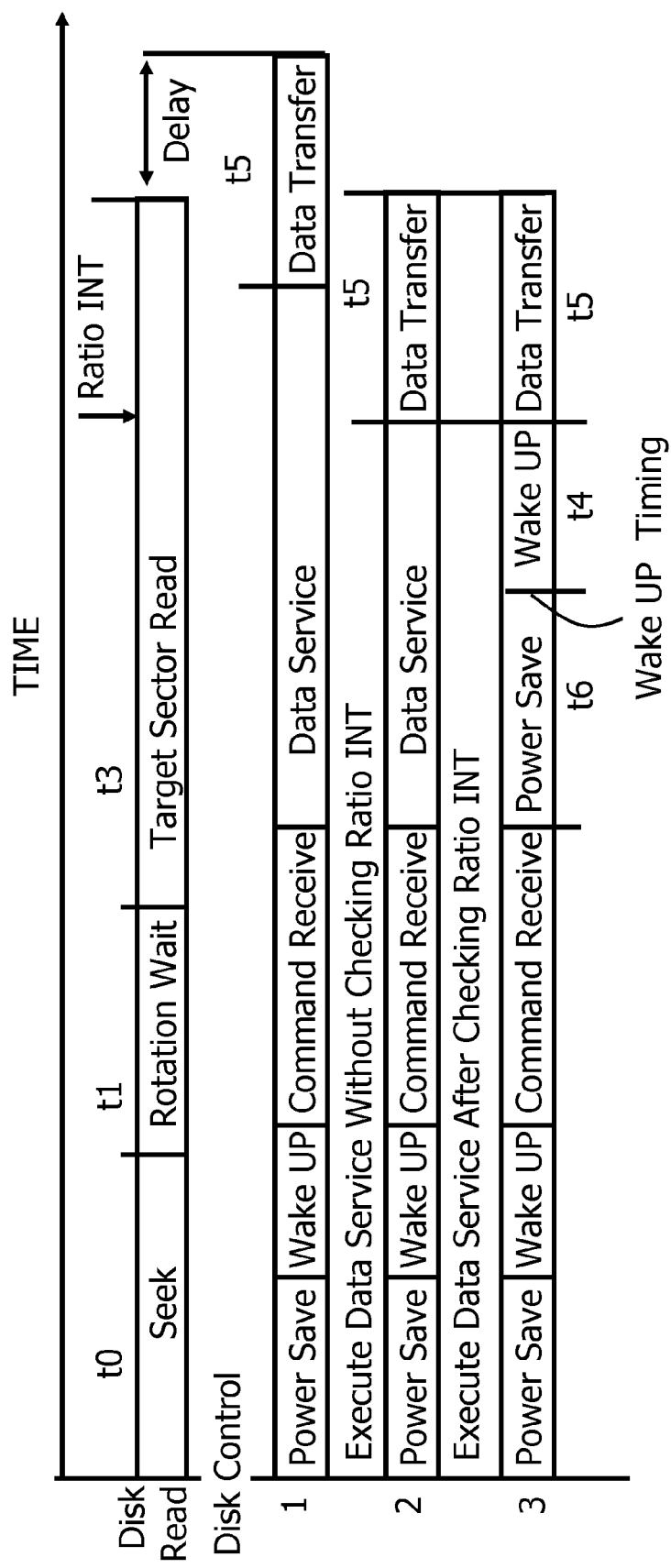

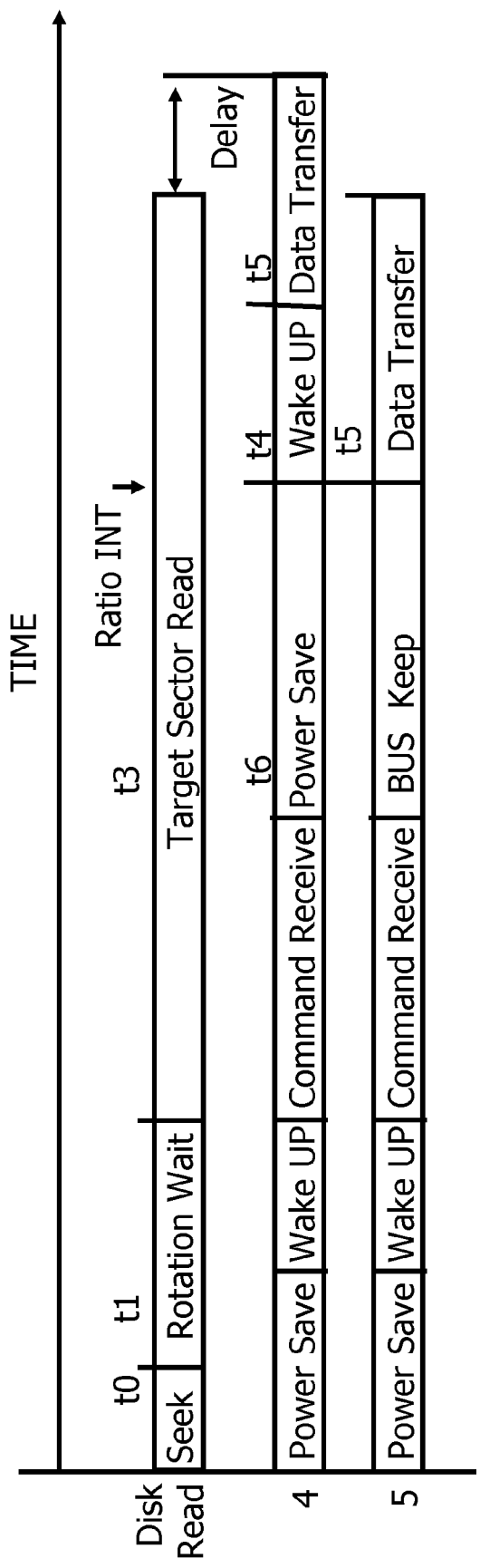

POWER CONSERVATION IN DATA STORAGE DEVICE BY ONLY STARTING THE ACTIVE STATE WHEN THE MEASURED TIME INDICATES DATA IS PRESENT ON THE INTERFACE

CROSS-REFERENCE TO RELATED APPLICATION

This application is based upon and claims the benefit of priority of the prior Japanese Patent Application No. 2008-071068, filed on Mar. 19, 2008, the entire contents of which are incorporated herein by reference.

FIELD

The embodiments discussed herein are related to a data storage device.

BACKGROUND

Data storage devices for various storage media, such as optical disks, magnetic tapes, and semiconductor memories, are known. Hard disk devices or hard disk drives (HDD) including magnetic disks are one type of the data storage devices.

The magnetic disks included in the HDD each have concentrically formed tracks, each of which is divided into sectors. Each sector stores data and address information of the sector. The magnetic disks are rotated at a speed as high as several thousand rotations per minute, and the access arm moves toward the center or outward based on the address information of the sector and a head provided at the tip of the access arm reads data (see FIG. 12). The data is read as signals, which are subjected to predetermined signal processing (such as waveform shaping and decoding processing) performed by a signal processing circuit and are then transmitted to a host. When write data or the like is transferred from the host, the signal processing circuit and so on process the data in a similarly manner and writes the processed data to the magnetic disks.

A SCSI (small computer system interface) protocol or ATA (advanced technology attachment) interface protocol is typically used as an interface protocol for the data transfer performed between the HDD and the host. In recent years, in an ATA interface in particular, serial ATA (SATA) has been proposed in which the conventionally used parallel transfer system is changed to the serial transfer system. The SATA allows high-speed transfer to be achieved with a simple cable structure.

However, in order to maintain serial communication with the host, the SATA system requires another power in addition to the power consumed in the conventional parallel transfer system. Thus, the SATA system is equipped with power saving functions for reducing the power consumption to the level that is substantially equal to that consumed in the parallel transfer system. As one of the power saving functions, device initiated SATA power management (DIPM) is available. The DIPM is aimed to reduce the power by reducing the level of the interface signal, which constantly consumes power, to a minimum level when no communication is performed.

A control method for the DIPM is that, when power saving is executed during a read seek operation, the HDD 1 wakes up (resumes) from the power saving state when data can be read from a target sector. The wake up time (the time for resuming from the power saving state) acts as an overhead, which delays the start of transfer of the data to the host. As a result, the performance of a read command for, particularly, a small sector size declines.

FIG. 13 illustrates an example of such a decline in the performance of a read command. Ratio INT (interrupt) illustrated in FIG. 13 indicates timing at which a preparation, such as a read seek operation, for reading data from a magnetic disk is completed and data transfer to the host can be started, and is associated with transfer rates between the host and the disk.

As illustrated in FIG. 13, the DIPM power saving is performed in the read seek operation, the ratio INT is reached at the timing at which data is readable from a target sector, and the HDD wakes up from the power saving state. Since the data transfer cannot be performed in the wake up time, a delay occurs correspondingly. In the known DIPM control method, the HDD wakes up from the power saving state at the ratio INT timing, as described above. Thus, there are problems in that the start of the data transfer is delayed and the performance declines.

As a technology for improving the performance of a HDD, native command queuing (NCQ) is available. The NCQ is a technology for improving the speed of accessing data. In the NCQ, instructions for the HDD (the instructions are one type of control commands issued from the host to the HDD) are stored in a queue and the instructions are rearranged so as to minimize the disk rotation and the head seek operation of the HDD.

A method for the NCQ control is that a data service for an NCQ command is unconditionally executed during the read seek operation and before the ratio INT timing. FIG. 14 illustrates an example of a decline in the performance of a read command based on NCQ.

In FIG. 14, during a read seek operation and before the ratio INT timing, data services 1 to 3 for NCQ commands are executed. Consequently, data is read from a target sector and the execution of the data services are continued even when the data can be transferred. Thus, the start of the transfer of the data for the read command to the host is delayed. Thus, the technology that is supposed to improve the performance of the HDD conversely provides a problem in that the performance of the HDD declines.

Japanese Laid-open Patent Publication No. 2006-139548, Japanese Laid-open Patent Publication No. 2006-139459, and Japanese Laid-open Patent Publication No. 2006-164012 disclose methods for reducing power consumption while preventing a decline in the performance of HDDs. More specifically, Japanese Laid-open Patent Publication No. 2006-139548 and Japanese Laid-open Patent Publication No. 2006-139459 propose methods for preventing a decline in the performance of the HDD by selecting a task that can be performed within a time when the bus is open, and Japanese Laid-open Patent Publication No. 2006-164012 proposes a power saving mode for preventing a decline in the performance of the HDD for host initiated SATA power management (HIPM).

SUMMARY

According to an aspect of the invention, a storage device for storing data includes: an interface controller connectable to a host via an interface, the interface controller having an active state capable of transmitting data to the host and an inactive state having a lower power consumption than the active state; a medium for storing data; a head for read out data stored in the medium; and a processor for executing a process including: receiving a command for reading out data stored in the medium from the host, determining timing when the data read out from the medium reaches the interface controller, and starting transition of the interface controller from the inactive state into the active state before the determined timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the operation of the HDD according to a first example in connection with processing time;

FIG. 10A and FIG. 10B illustrate an operation example of the HDD according to the third example;

DESCRIPTION OF EMBODIMENTS

Embodiments of the present invention will be described below with reference to the accompanying drawings. The present invention is not limited to the embodiments described below and, needless to say, may be practiced in any form that can realize the same functions as the functions described blow.

Figure 1:
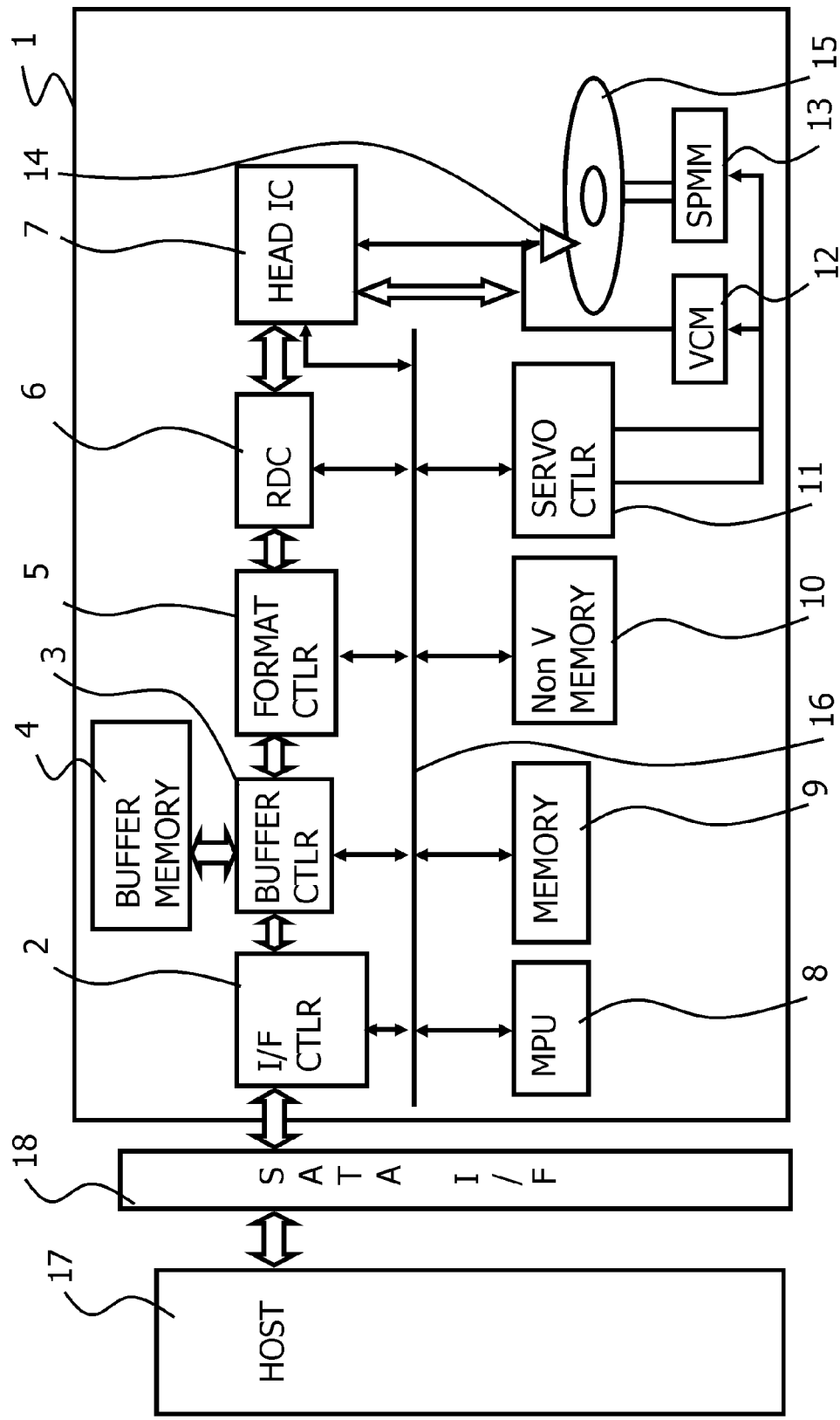
FIG. 1 is a block diagram of the hardware configuration of a HDD according to the present invention.

FIG. 1 is a block diagram of the hardware configuration of a HDD (hard disk drive) according to an embodiment of the present invention. The HDD uses a SATA interface. The SATA HDD can execute DIPM (device initiated SATA power management) power saving during a read seek operation of the HDD, while maintaining the performance of the HDD. A HDD 1 serves as a storage device for storing data transmitted from high-order equipment (a host) 17, which performs data processing, through a SATA interface 18. Examples of the host 17 include a computer and a digital camera.

The HDD 1 has a disk medium 15, a read/write magnetic head 14 that reads/writes data from/to a recording surface of the disk medium 15, a voice coil motor (VCM) 12 for actually moving a head actuator, and a spindle motor (SPMM) 13 for rotating the disk medium 15. In order to read/write data from/to the disk medium 15, the HDD 1 has a head IC (integrated circuit) 7 and a servo controller (servo CTLR) 11 for controlling those elements.

The HDD 1 further has an interface controller (I/F CTLR) 2, a buffer controller (buffer CTLR) 3, a buffer memory 4, a format controller (format CTLR) 5, and a read/write channel 6. The interface controller 2 controls the SATA interface 18, which serves as an interface with the host 17. The interface controller 2 includes an active state capable of transmitting data to the host and an inactive state having a lower power consumption than the active state. The buffer memory 4 temporarily stores data to be written to the disk medium 15, data read from the disk medium 15, and data transferred from the host 17. The buffer controller 3 controls the buffer memory 4. The format controller 5 performs data processing on data transferred from the host 17 or data to be transferred to the host 17. The read/write channel 6 converts data into a write signal according to data writing and converts data into a read signal according to data reading. These elements in the HDD 1 are interconnected through a bus 16. An MPU (micro processing unit (processor)) 8 controls the elements in the HDD 1 by using a memory 9 to execute a control program stored in a flash read only memory (FROM) 10. The memory 9 is used for the processing performed by the MPU 8 and also stores control data.

An operation according to the present embodiment is realized by the MPU 8 executing the control program. The HDD 1 is operated so as to allow data transfer according to the timing at which data becomes readable from the disk medium 15 upon reception of a read command from the host 17. By doing so, a decline in the performance of the HDD 1 is prevented and power consumption is reduced.

Figure 2:
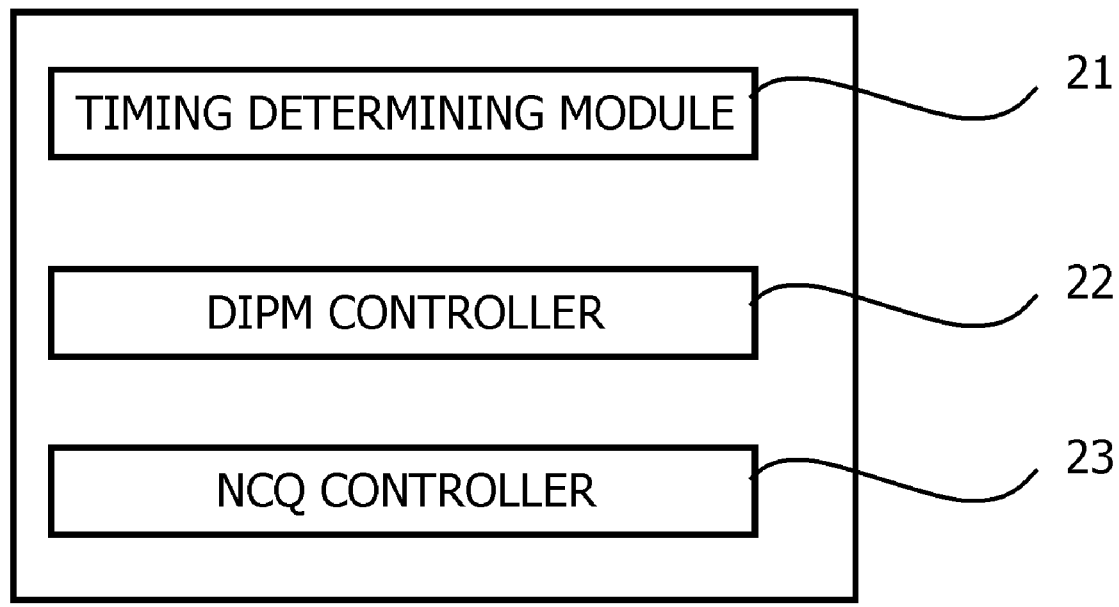
FIG. 2 illustrates the configuration of a program executed by an MPU in the present embodiment.

FIG. 2 illustrates the configuration of a program executed by the MPU 8. As illustrated in FIG. 2, the program executed by the MPU 8 includes timing determining module 21, DIPM (device initiated SATA power management) controller 22, and NCQ controller 23.

Upon receiving a read command for reading data from the disk medium 15 in the HDD 1 from the host 17, the timing determining module 21 determines ratio INT timing at which data becomes readable from the disk medium 15 and becomes transferable. Further, based on the determined ratio INT timing, the timing determining module 21 determines timing (wake up timing) for waking up (resuming) so that the data is transferable according to the ratio INT timing when power saving is performed using a DIPM function. The timing determining module 21 determines timing to start transition of the interface controller 2 from the inactive state into the active state before the determined timing.

The DIPM controller 22 performs control, for example, for executing DIPM power saving and for stopping the DIPM power saving and waking up the HDD 1 by transmitting a control signal to the interface controller 2 on the basis of the timing determined by the timing determining module 21.

On the basis of the timing determined by the timing determining module 21, the NCQ controller 23 controls the execution of NCQ commands queued in the memory 9 for execution during a read seek operation.

The control program (illustrated in FIG. 2) for controlling the operation of the HDD 1 illustrated in FIG. 1 will now be described in detail in conjunction with first to third examples. The first example is described with particular attention being given to the timing determining module 21 and the DIPM controller 22 illustrated in FIG. 2, the second example is described with particular attention being given to the timing determining module 21 and the NCQ controller 23, and the third example is directed to an example of a specific operation.

First, the first example will be described with reference to FIGS. 3 to 5. When the HDD 1 receives a read command from the host 17, the MPU 8 in the HDD 1 executes the control program for operating the VCM 12, the SPMM 13, and the head 14, transmits a control instruction to the servo controller 11 and the head IC 7, and starts a read seek operation so that data can be read from the disk medium 15. Descriptions of the processing are omitted herein.

Upon start of the read seek operation of the HDD 1, the timing determining module 21 determines ratio INT timing (see "Ratio INT" in FIG. 3) at which data transfer during a disk read operation can be started. When the DIPM power saving is performed, the timing determining module 21 also determines timing (see "Wake Up Timing" in FIG. 3) for waking up (resuming) so that data transfer to the SATA interface 18 can be started according to the determined ratio INT timing.

When the HDD 1 receives a read command from the host 17, the DIPM controller 22 controls the interface controller 2 so that the HDD 1 is put into a power saving state. For example, the power saving state is an inactive state including a lower power consumption than the active state. The power saving state may output the interface signal to the SATA interface 18. The DIPM controller 22 then controls the interface controller 2 so that the HDD 1 is put into the active state in which the interface signal output to the SATA interface 18 becomes a state capable of the data transfer, according to the wake up timing determined by the timing determining module 21.

A description will be given below of the ratio INT timing and the wake up timing determined by the timing determining module 21. In FIG. 3, "Disk Read" (at the upper side in FIG. 3) illustrates processing time for reading data from the disk medium 15. The processing time of the disk read includes seek time (t0), rotation wait time (t1), and disk read time (t3).

The seek time (t0) in FIG. 3 indicates a cylinder moving time, which is pre-defined based on, for example, the performance of motors, such as the VCM 12 and the SPMM 13. The cylinder moving time is pre-stored in the memory 9 in the HDD 1.

Figure 4A:
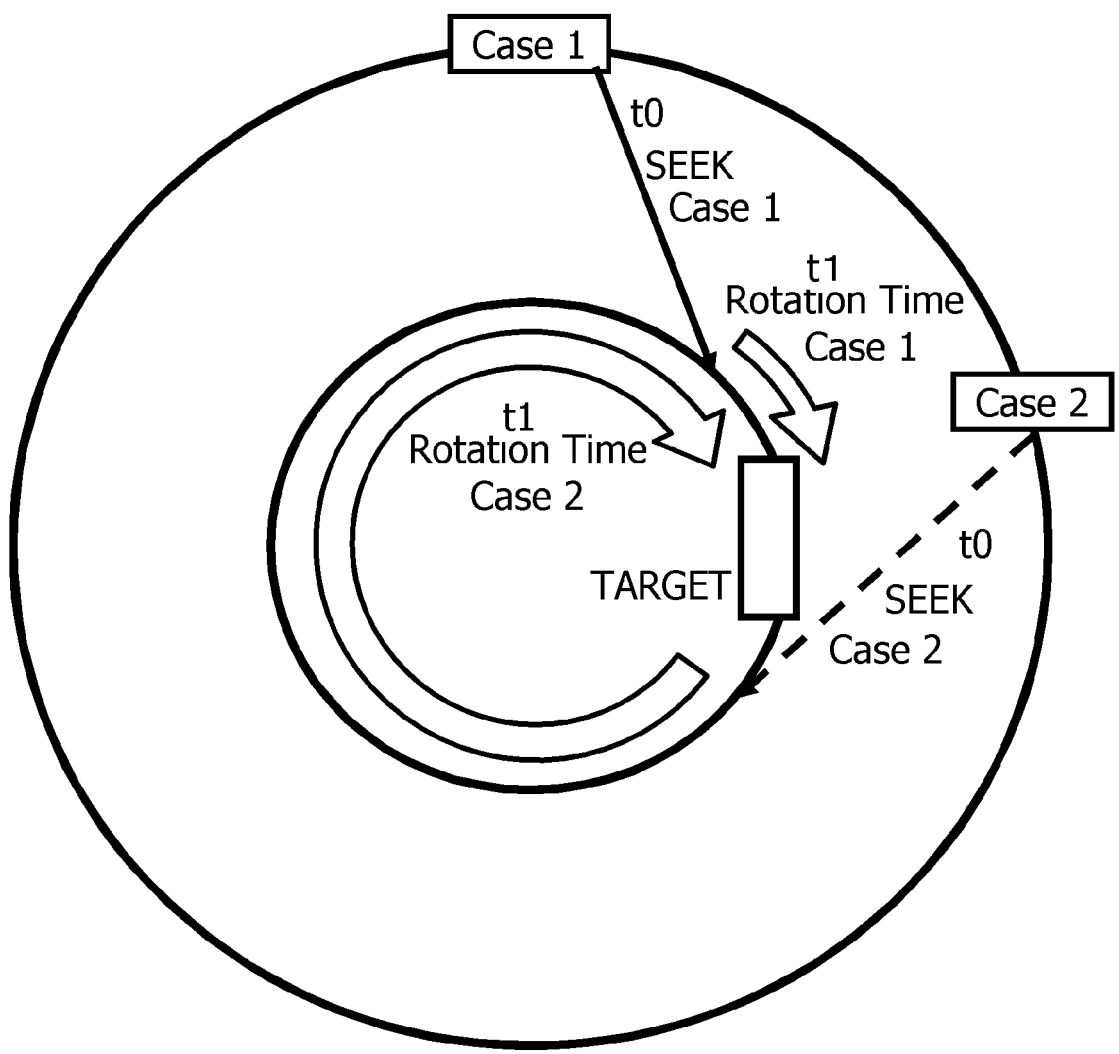
FIG. 4A and FIG. 4B illustrate seek time, rotation wait time, and moving time.
Figure 4B:
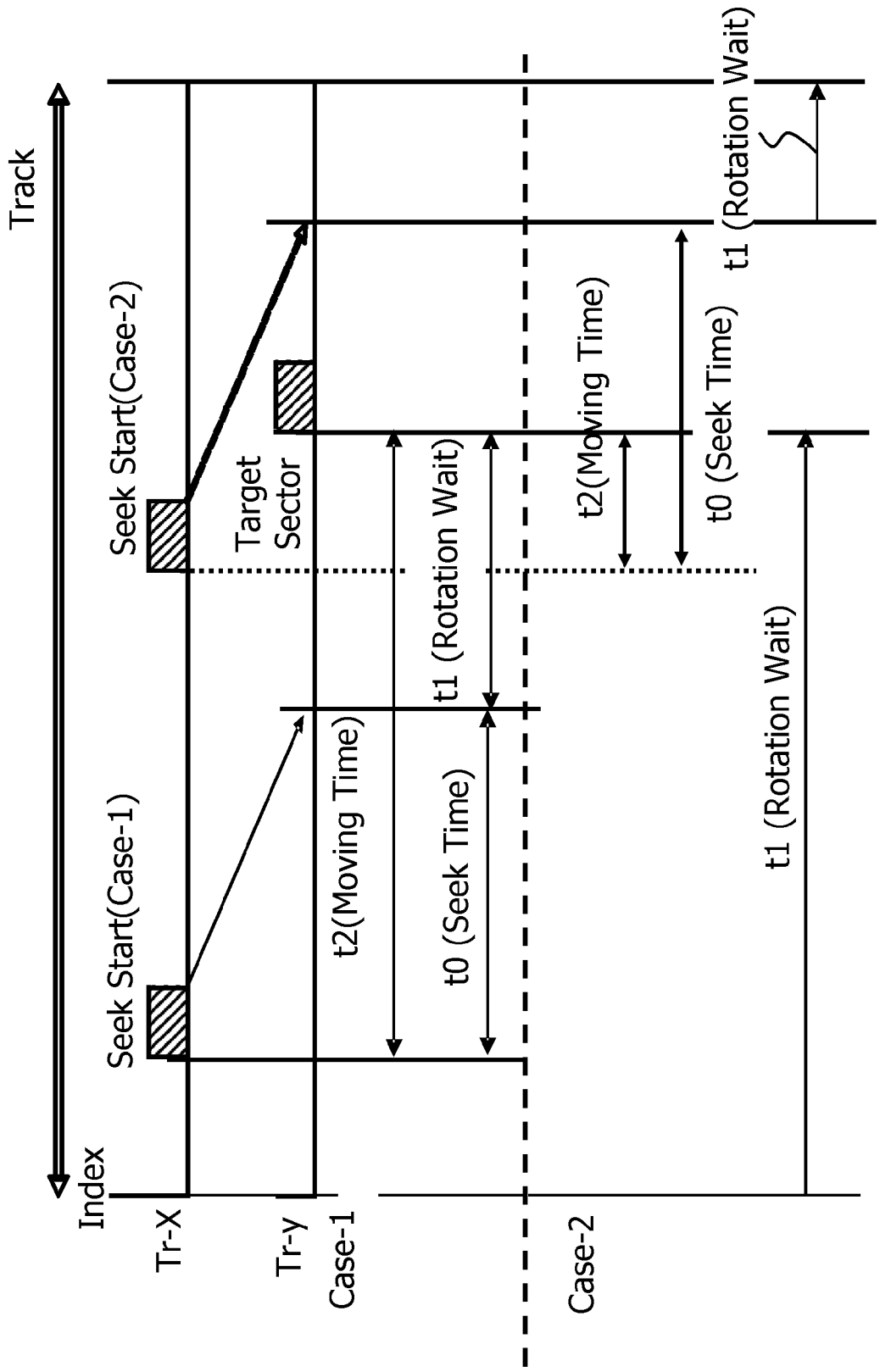

The rotation wait time (t1) represents a rotation waiting time from the start of a seek operation until the head 14 reaches a target sector. FIG. 4A and FIG. 4B illustrate an operation that moves the head to target position of the medium, and reads data stored in the target position. The rotation wait time (t1) can be determined by subtracting the seek time (t0) from moving time (t2), which is determined from the physical position of the sector at the seek start time and the physical position of the target sector (see Case 1 and Case 2 in FIG. 4). For Moving Time (t2)>Seek Time (t0), the rotation wait time may be simply calculated by:

Rotation Wait Time($t1$)=Moving Time($t2$)−Seek Time ($t0$)

For Moving Time (t2)<Seek Time (t0), the rotation wait time is calculated by:

Rotation Wait Time($t1$)=Time of One Rotation of Disk−(Seek Time($t0$)−Moving Time($t2$)).

A fixed value may be used for the rotation wait time (t1), although the accuracy decreases. In such a case, the fixed value is pre-stored in the memory 9 in the HDD 1, as in the case of the seek time (t0). The disk read time (t3) is a time determined from the recording density of the track on which a target sector is located. The recording density of a disk medium has variations. The memory 9 has a table or the like for storing the recording densities for respective tracks. The table is referred to obtain the recording density of the track on which the target sector is located, and read time "disk read time (t3)" is determined. As described above, the seek time (t0), the rotation time (t1), and the disk read time (t3) associated with the disk read processing time are determined.

In addition, the ratio INT timing can be determined by subtracting data transfer time (t5) of the SATA interface from the disk read processing time. The data transfer time can also be determined from the SATA interface speed (e.g., SATA=1.5 or 3.0 Gbps). The specification of the SATA interface is also stored in the memory 9. The following expression is given:

Ratio INT Timing=Seek Time($t0$)+Rotation Time($t1$)+ (Disk Read Time($t3$)−Data Transfer Time($t5$))  (1)

As described above, the timing determining module 21 determines the ratio INT timing from pre-given values.

Next, the wake up timing is determined based on the determined ratio INT timing. As processing time illustrated in disk control operation (1) illustrated in FIG. 3, conventionally, the HDD is caused to wakes up at the ratio INT timing at which data is transferable. Consequently, the data transfer time is delayed by an amount of time for the wakeup.

The delay can be addressed by setting the wake up timing earlier by an amount of time corresponding to wake up time (t4) to wake up. The wake up time (t4) is a time for waking up from the power saving state and has a fixed value defined by, for example, the specifications of the HDD. For reference's sake, in the SATA HDD specifications, the wake up time (t4) is standardized so that it is within 10 μs in the partial power saving state and within 10 ms in the slumber power saving state, but the wake up time varies depending on the method for power saving. Thus, wake up time corresponding to a predetermined power saving method is used. In any case, the wake up time (t4) has a value stored in the memory 9 in the same manner as the cylinder moving time and so on. Thus, the following expression (2) can be given.

Wake Up Timing=Ratio INT Timing−Wake Up Time ($t4$)  (2)

As described above, the timing determining module 21 determines the ratio INT timing and the wake up timing, and the DIPM controller 22 controls the interface controller 2 so as to restore the interface signal, whose level has been the minimum level, to its original level, so that data becomes transferable at the wake up timing through the SATA interface 18.

Disk control operation (2) illustrated in FIG. 3 is an example of operation of the first example. In the disk control operation (2) according to first example, data is transferable at the ratio INT timing. Thus, no delay occurs, which allows power consumption to be efficiently reduced while maintaining the performance of the read command.

Figure 5:
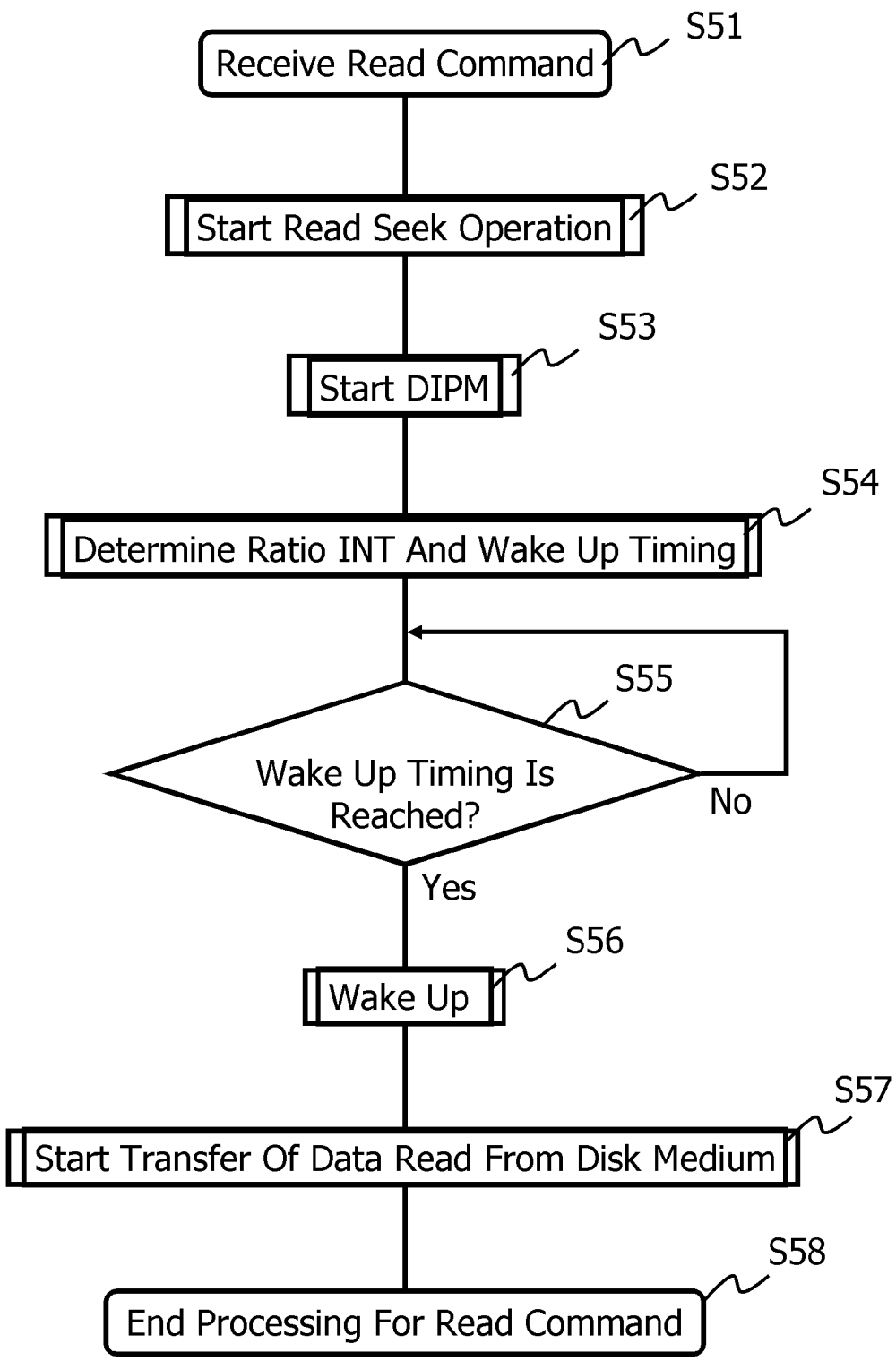
FIG. 5 illustrates an operation flow of the HDD according to the first example.

FIG. 5 illustrates an operation flow of the HDD 1 according to the first example. First, in step S51, a read command is received. In step S52, a read seek operation is started. In step S53, when no communication is performed, DIPM power saving is started to reduce the level of the interface signal, which constantly consumes power, to a minimum level. In step S54, the timing determining module 21 determines the ratio INT timing and the wake up timing. Thereafter, in step S55, the DIPM controller 22 determines whether or not the wake up timing is reached. When the wake up timing is not reached (N), the power saving is maintained. When the wake up timing is reached (Y), the process proceeds to step S56, in which the DIPM controller 22 controls the interface controller 2 so as to restore the interface signal to the state for communication. Thus, in step S57, the HDD 1 starts transfer of data read from the disk medium 15. In step S58, the HDD 1 can end the processing for the read command.

A second example will be described next with reference to FIGS. 6 and 7. In the second example, when an NCQ-command data service executed during a read seek operation is started, a determination is made as to whether or not the execution of the data service is to be completed before the ratio INT timing so that the start of transfer of data for a read command being executed is not delayed. Further, control is performed so that, when the execution of the data service is to be completed before the ratio INT timing, the data service is executed, and when the execution of the data service is not to be completed before the ratio INT timing, the data service is not executed. Such an operation will now be described with reference to FIG. 6.

Figure 6:
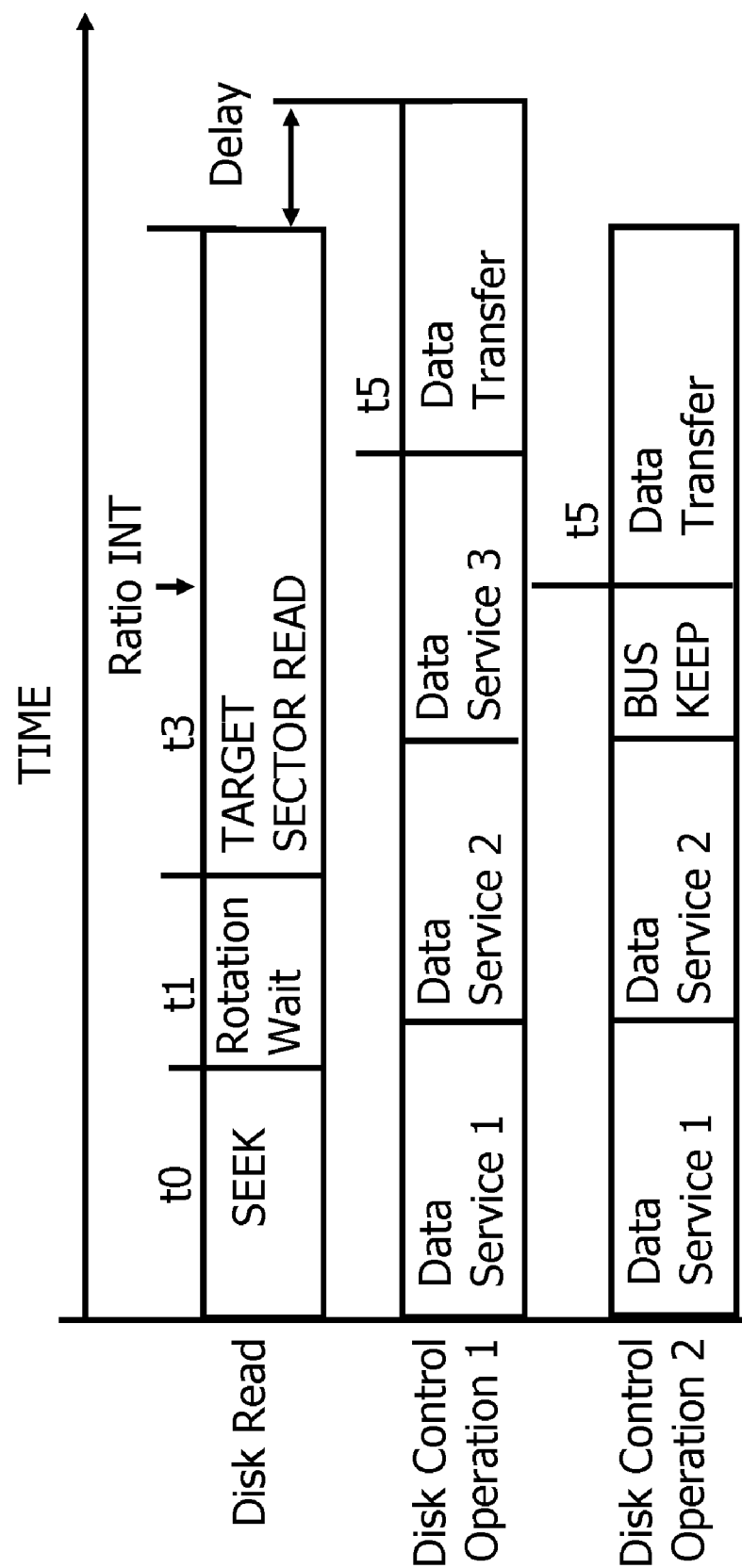
FIG. 6 illustrates the operation of the HDD according to a second example in connection with processing time.

Conventionally, as illustrated in processing time in disk control operation (1) in FIG. 6, after receiving a read command, the HDD 1 sequentially executes data services for NCQ commands queued during a read seek operation. In the known disk control operation (1) illustrated in FIG. 6, the HDD 1 has already started execution of data services 1 to 3. Thus, even when the ratio INT timing at which the data is transferable is reached, execution of data service 3 has not finished and thus the data transfer cannot be started, which leads to a decline in the performance of the HDD 1.

Accordingly, during execution of an NCQ-command data service during the read seek operation, control may be performed to determine whether or not the execution end time of the data service is earlier than the ratio INT timing at which the data transfer can be started and to execute the data service when the data service is to be completed before the ratio INT timing. Such control can maintain the performance of the HDD 1. The operation of the NCQ controller 23 for performing such control will now be described.

The NCQ controller 23 determines time (data service time (t)) according to processing for each data service. The data service time (t) is determined using a SATA interface speed (e.g., SATA=1.5 or 3.0 Gbps), in the same manner as the data transfer time (t5). That is, the following expression can be given:

$$\text{Data Service Time}(t) = \text{SATA Interface Speed} + \alpha$$

where α is control time processed before the data service time.

The data service time (t) varies depending on the individual data service, and the amount of control time for each data service is stored in a table or the like in the memory 9. The table or the like is used to determine the time of each data service.

When the HDD 1 receives a read command, the NCQ controller 23 compares the ratio INT timing determined by the timing determining module 21 with the end time of a data service, in the same manner as the first example, and performs control to execute the data service when the end time of the data service is earlier than the ratio INT timing. Upon finding another data service, the NCQ controller 23 compares the ratio INT timing with the end time of the found data service and determines whether or not the data service is executable.

That is, the NCQ controller 23 executes the data service when expression (3) below is satisfied.

$$\text{Ratio INT Timing} \geq \text{End Time of Data Service} \quad (3)$$

The NCQ controller 23 continues searching for an executable command without executing the data service when expression (4) below is satisfied.

$$\text{Ratio INT Timing} < \text{End Time of Data Service} \quad (4)$$

The operation for comparing the ratio INT timing with the end time of the data service and for executing the data service when it is executable can be executed multiple times, and the data service can be executed any number of times until the ratio INT timing is reached. When the time during which the data service is executable runs out, the NCQ controller 23 waits for the ratio INT timing and starts transfer of data for the read command.

Disk control operation (2) illustrated in FIG. 6 indicates an example of processing time according to a second example. In the operation (2) of the second example, before execution of a data service, a determination is made as to whether or not the end time of the data service to be executed is earlier or later than the ratio INT timing. Thus, data services 1 are 2 are executable, but bus keep (which herein means maintaining the current state without doing any processing) is performed without execution of data service 3 and the ratio INT timing is waited for. Thus, the data transfer can be started according to the timing at which data for a read command becomes transferable. In the operation of the second example, therefore, it is possible to transfer data for a read command without delay.

In this manner, according to the second example, it is possible to prevent a decline in the performance of the read command and it is possible to efficiently execute NCQ-command data services.

Figure 7:
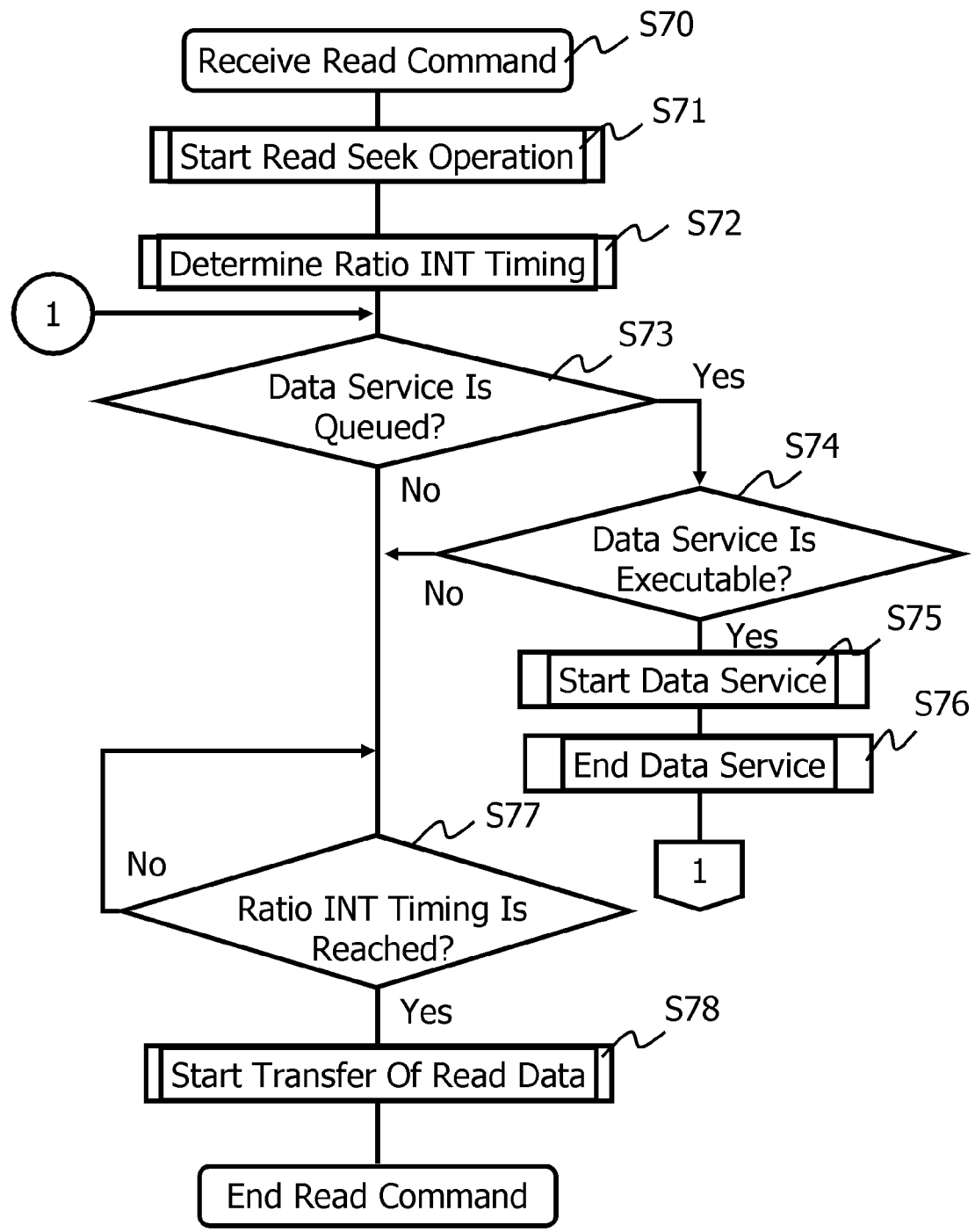
FIG. 7 illustrates an operation flow of the HDD according to the second example.

FIG. 7 illustrates the operation flow of the HDD 1 according to the second example. First, in step S70, a read command is received. In step S71, a read seek operation is started. In step S72, the timing determining module 21 determines ratio INT timing. In step S73, the NCQ controller 23 determines whether or not an NCQ-command data service is queued. When a data service is queued (Y), the process proceeds to step S74, in which a determination is made as to whether or not the data service is executable. That is, based on expressions (3) and (4) described above, a determination is made as to whether or not the data service is executable. When the data service is executable (Y), the execution of the data service is started in step S75. When the data service is completed in step S76, the process returns to step S73. When it is determined in step S74 that the data service is not executable (N), the process proceeds to step S77. In step S77, a determination is made as to whether or not the ratio INT timing is reached. When the ratio INT timing is not reached (N), the operation is put into a bus-keep state. When the ratio INT timing is reached (Y), the process proceeds to step S78, in which the transfer of data read from the disk medium 15 is started. In step S79, the processing for the read command ends.

A third example will now be described with reference to FIGS. 8 and 9. The third example has a configuration that includes both the DIPM controller 22 and the NCQ controller 23. Conventionally, an NCQ-command data service executed during a read seek operation is executed at the same timing as the DIPM control, and when an NCQ command is held, i.e., when an NCQ command is queued, DIPM control is not executed. However, in a case in which no executable data service exists after the NCQ-command data service is executed during the read seek operation, when there is an enough time, DIPM power saving may be executed to reduce power consumption. Accordingly, in the third example, the first and second examples described above are combined to execute both the NCQ-command data services and the DIPM power saving in order to improve the performance and reduce the power consumption.

In the third example, first, during a read seek operation, an NCQ-command data service is started, and then, when any more data service cannot be executed during the read seek operation, power saving is performed when the time for the power saving is available.

The operation of the third operation will now be described in more detail. First, the timing determining module 21 determines the ratio INT timing and the wake up timing, as in the first and second examples. On the other hand, as in the second example, the NCQ controller 23 determines data service time (t) that is a time for executing a data service for an NCQ command that is queued. The timing determining module 21 performs processing for causing the data service to be executed when expression (5) below is satisfied.

Ratio INT Timing ≧ End Time of Data Service (5)

On the other hand, the timing determining module 21 does not execute the data service when expression (6) below is satisfied.

Ratio INT Timing < End Time of Data Service (6)

In addition, when expression (6) is satisfied (i.e., the data service is not to be executed), the DIPM controller 22 determines whether or not power save time (t6) and wake up time (t4) can be ensured before the ratio INT timing. The power-saving time (t6) represents a control time for performing power saving and has a predetermined value, which is stored in the memory 9.

The DIPM controller 22 performs processing for causing power saving to be executed, when expression (7) below is satisfied.

Ratio INT Timing ≧ Power Save Time(t6)+Wake Up Time(t4) (7)

On the other hand, the DIPM controller 22 gives up the power saving and performs processing for performing bus keep until the ratio INT timing and for starting transfer of data for the read command, when expression (8) below is satisfied.

Ratio INT Timing < Power Save(t6)+Wake Up(t4) (8)

When the power saving is executed in the case of expression (7), the HDD 1 wakes up at the wake up timing determined by the timing determining module 21, as in the first example.

Figure 8:
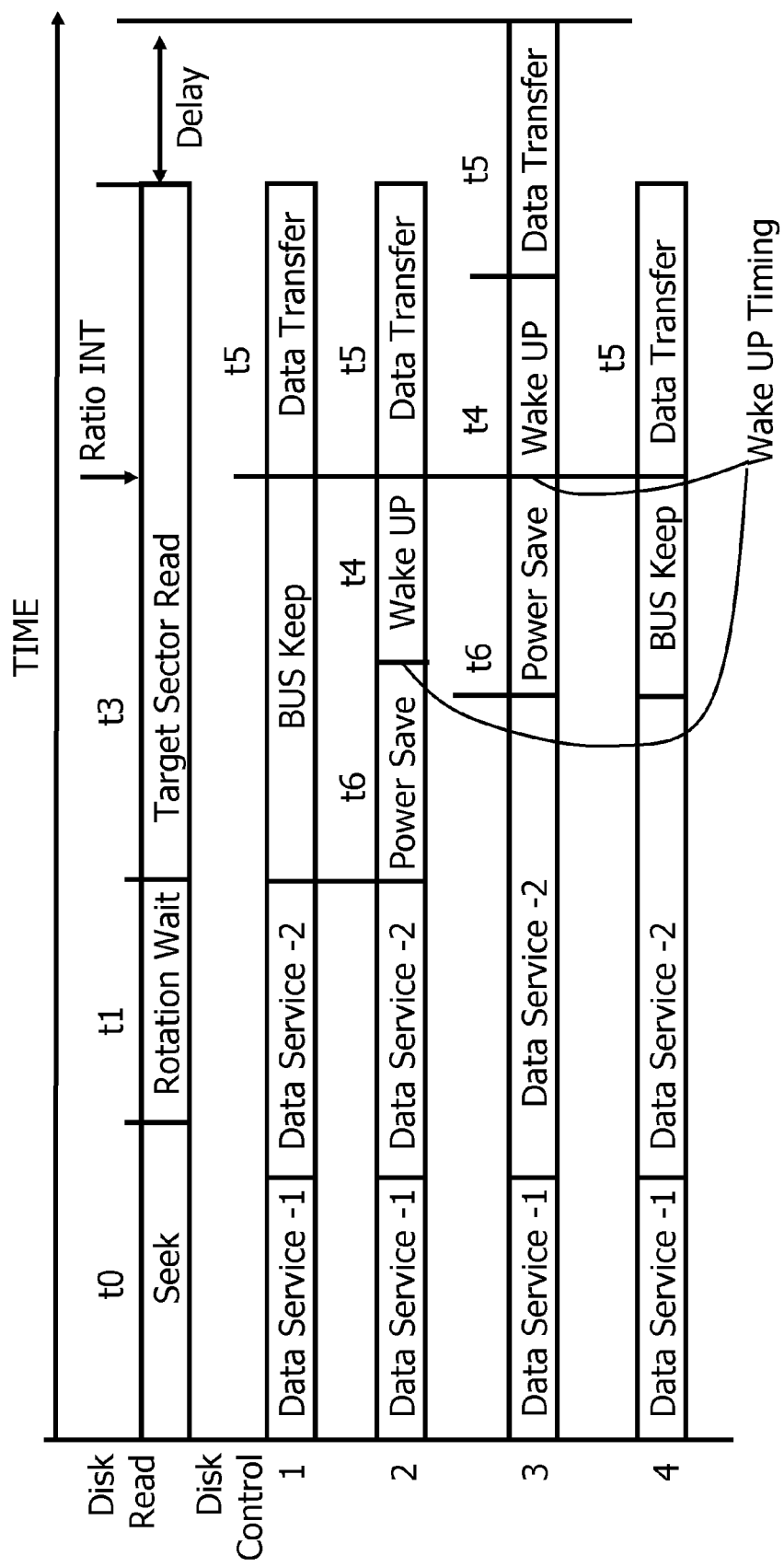
FIG. 8 illustrates an operation example of the HDD according to a third example.

FIG. 8 illustrates an example of the operation according to the third example. Referring first to processing time in known disk control operation (1) illustrated in FIG. 8, data services 1 and 2 for NCQ commands are executed during a seek operation, the bus keep is then performed, the ratio INT timing is waited for, and data transfer is started. Thus, the data transfer is not delayed, but the power consumption is not reduced since the bus keep is performed.

Processing time in disk control operation (2) illustrated in FIG. 8 is described next. Processing time in the disk control operation (2) is illustrated in comparison with the processing time in the known control operation (1) illustrated in FIG. 8. Data services 1 and 2 for NCQ commands are executed during the read seek operation, power saving is then executed since a time for the power saving is available, and then the HDD 1 wakes up so that the data becomes transferable immediately when the ratio INT timing is reached. This operation, therefore, allows the power consumption to be reduced without a decline in the performance of the HDD 1.

Processing time in NCQ and DIPM control operation (3) illustrated in FIG. 8 will be described next. This operation (3) illustrated in FIG. 8 is a known example of a case in which data services for NCQ commands are executed and DIPM power saving is simply executed. After data services 1 and 2 for NCQ commands are executed, power saving is performed without considering the time for controlling the power saving, and the HDD 1 then wakes up at the ratio INT timing. Thus, a delay occurs before the data transfer is started.

In contrast, in the case of processing time in disk control operation (4) illustrated in FIG. 8, after data services 1 and 2 for NCQ commands are executed, the time for controlling the power saving is considered. Thus, the bus keep is performed without execution of the power saving, and the data is transferable at the ratio INT timing. Although this operation does not contribute to a reduction in the power consumption, the data transfer can be started at the ratio INT timing, thus making it possible to prevent the reduction in the performance of the HDD 1.

Figure 9:
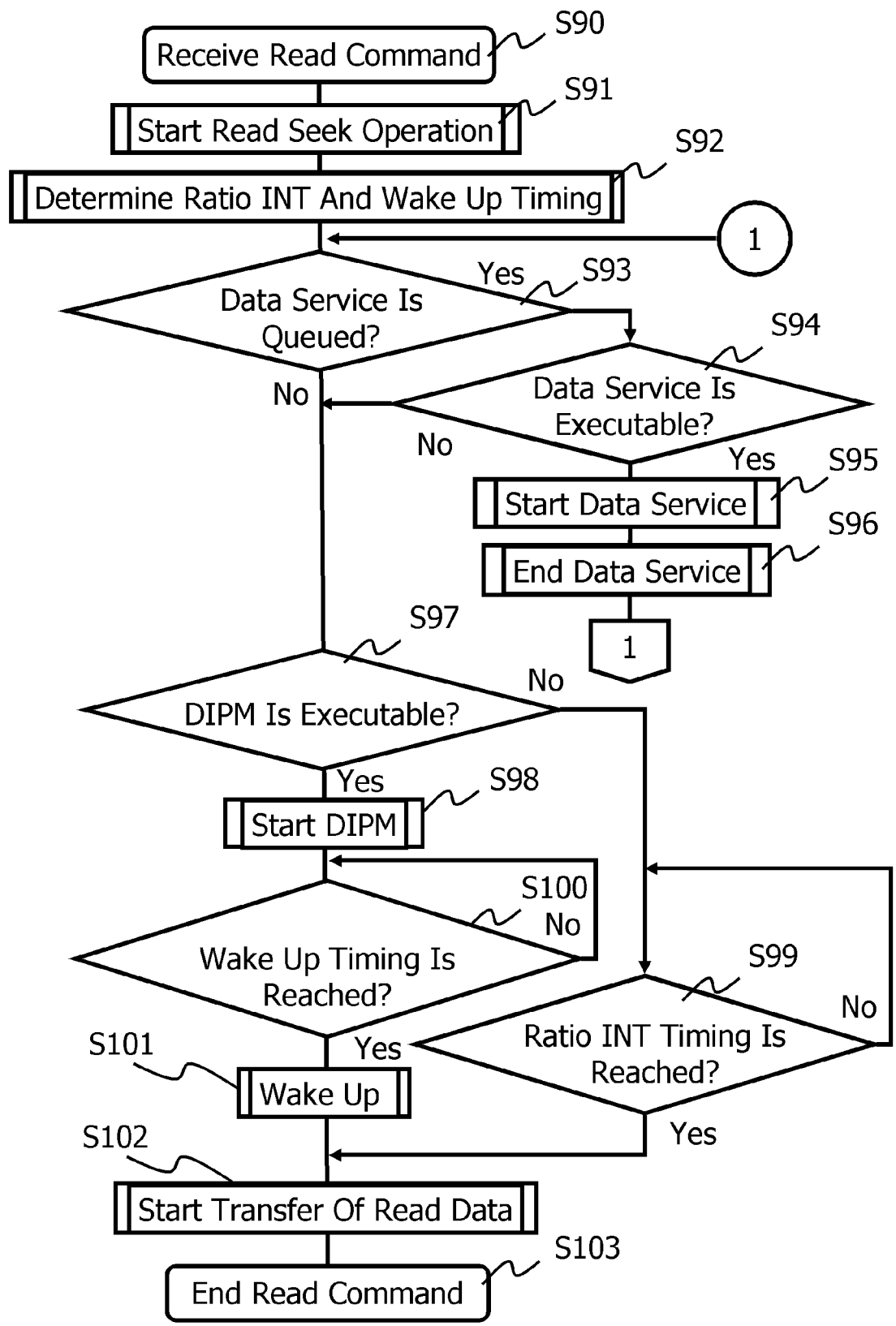
FIG. 9 illustrates an operation flow corresponding to the operation illustrated in FIG. 8.

FIG. 9 illustrates an operation flow of the HDD 1, the flow corresponding to the operation illustrated in FIG. 8. First, in step S90, a read command is received. In step S91, a read seek operation is started. In step S92, the timing determining module 21 determines ratio INT timing and wake up timing. In step S93, the NCQ controller 23 determines whether or not an NCQ-command data service is queued. When a data service is queued (Y), the process proceeds to step S94, in which a determination is made as to whether or not the data service is executable. Detailed processing in this case is the same as that in step S74 in the second example. When the data service is executable (Y), the execution of the data service is started in step S95. When the data service is completed in step S96, the process returns to step S93. When it is determined in step S94 that the data service is not executable (N), the process proceeds to step S97. In step S97, the timing determining module 21 determines whether or not the time for controlling DIPM power saving can be ensured before the ratio INT timing. That is, the timing determining module 21 makes the determination on the basis of conditional expressions (7) and (8) noted above. When it is determined in step S97 that DIPM power saving can be performed (Y), the process proceeds to step S98. When it is determined in step S97 that DIPM power saving cannot be performed (N), the process proceeds to step S99. In step S99, a determination is made as to whether or not the ratio INT timing is reached. When the ratio INT timing is not reached (N), the operation is put into the bus-keep state. When the ratio INT timing is reached (Y), the process proceeds to step S102, in which transfer of data read from the disk medium 15 is started. In step S103, the processing for the read command ends.

When it is determined in step S97 that DIPM power saving can be performed (Y), the process proceeds to step S98, in which DIPM power saving is executed. Thereafter, in step S100, a determination is made as to whether or not the wake up timing is reached. This determination is analogous to the processing performed in step S55 in the first example. When it is determined in step S100 that the wake up timing is not reached (N), the power saving state is maintained. When it is determined in step S100 that the wake up timing is reached (Y), the process proceeds to step S101, in which the HDD 1 wakes up. Thereafter, in step S102, the HDD 1 can start transfer of data read from the disk medium 15. In step S103, the HDD 1 can end the processing for the read command.

A description will further be given of another operation example of the HDD 1 according to the third example, the HDD 1 having a configuration including the DIPM controller 22 and the NCQ controller 23. While the operation example illustrated in FIG. 8 is an example of a case in which NCQ commands are queued when the HDD 1 receives a read command from the host 17, an operation example of a case in which no NCQ command is queued when the HDD 1 receives a read command and then the HDD 1 receives an NCQ command after executing DIPM power saving will now be described with reference to FIGS. 10A, 10B, 11A and 11B.

First, processing time in known disk control operation (1) illustrated in FIG. 10A will be described. When the HDD 1 receives an NCQ command when it is in the power saving state during the disk control operation during a read seek operation, the received NCQ command is unconditionally executed. As a result, the time of a data service exceeds the ratio INT timing and the start of data transfer to be executed is delayed, which may cause a decline in the performance of the HDD 1.

The decline in the performance can be prevented by disk control operations (2) and (3) illustrated in FIG. 10A according to the third example. More specifically, the disk control operation (2) in FIG. 10A is performed in a case in which, when the HDD 1 receives a read command, power saving is executed since no NCQ-command data service is queued, and then an NCQ-command data service is received during the power saving state. In this example, since the execution of the received NCQ-command data service is to be completed before the ratio INT timing, the data service is executed.

In addition, the disk control operation (3) in FIG. 10A is performed in a case in which, when the HDD 1 receives a read command, no NCQ-command data service is queued, and then the HDD 1 receives an NCQ-command data service, as in the disk control operation (2) in FIG. 10A. In this example, since execution of the received NCQ-command data service is not to be completed before the ratio INT timing, the data service is not executed. In addition, in the operation (3) in FIG. 10A, the time for executing the data service is not available but the time for performing power saving is available (i.e., Ratio INT Timing≧Power Save Time (t6)+Wake Up Time (t4)), and thus, the power saving is executed. Further, after the power saving is executed, the HDD 1 wakes up so that the data becomes transferable at the ratio INT timing.

As described above, when no NCQ-command data service is queued immediately after reception of a read command, power saving is executed, and then, when an NCQ command is received during the power saving state, the NCQ command is executed when it is determined that the time for executing the NCQ command can be ensured before the ratio INT timing. As a result, it is possible to improve the performance of the HDD 1.

Disk control operation (4) in FIG. 10B is an operation of a known example in which, when the HDD 1 receives a read command, power saving is executed since no NCQ-command data service is queued, and then an NCQ-command data service is received during the power saving state. In this example, although the power saving is executed since the time for executing the NCQ-command data service is not available, the HDD 1 requires a large amount of time to wake up and thus a delay occurs.

Even in such a case, the performance of the HDD 1 can be improved by disk control operation (5) in FIG. 10B according to the third example. In the disk control operation (5) in FIG. 10B, when an NCQ command is received, a determination is made as to whether or power saving and waking up can be completed before the ratio INT timing. When it is determined that power saving and waking up cannot be completed before the ratio INT timing, the bus keep is performed and the ratio INT timing is waited for. With this operation, at the timing at which transfer of data read from the disk medium 15 can be started, the data is transferred without delay.

Determining whether or not a data service or power saving is executable after reception of an NCQ command and executing corresponding control, as described above, allows transfer of data corresponding to a read command sent from the host 17 to be started without delay during a read seek operation. As described above, the HDD 1 having the configuration according to third example can appropriately reduce the power consumption while maintaining the performance.

Figure 11A:
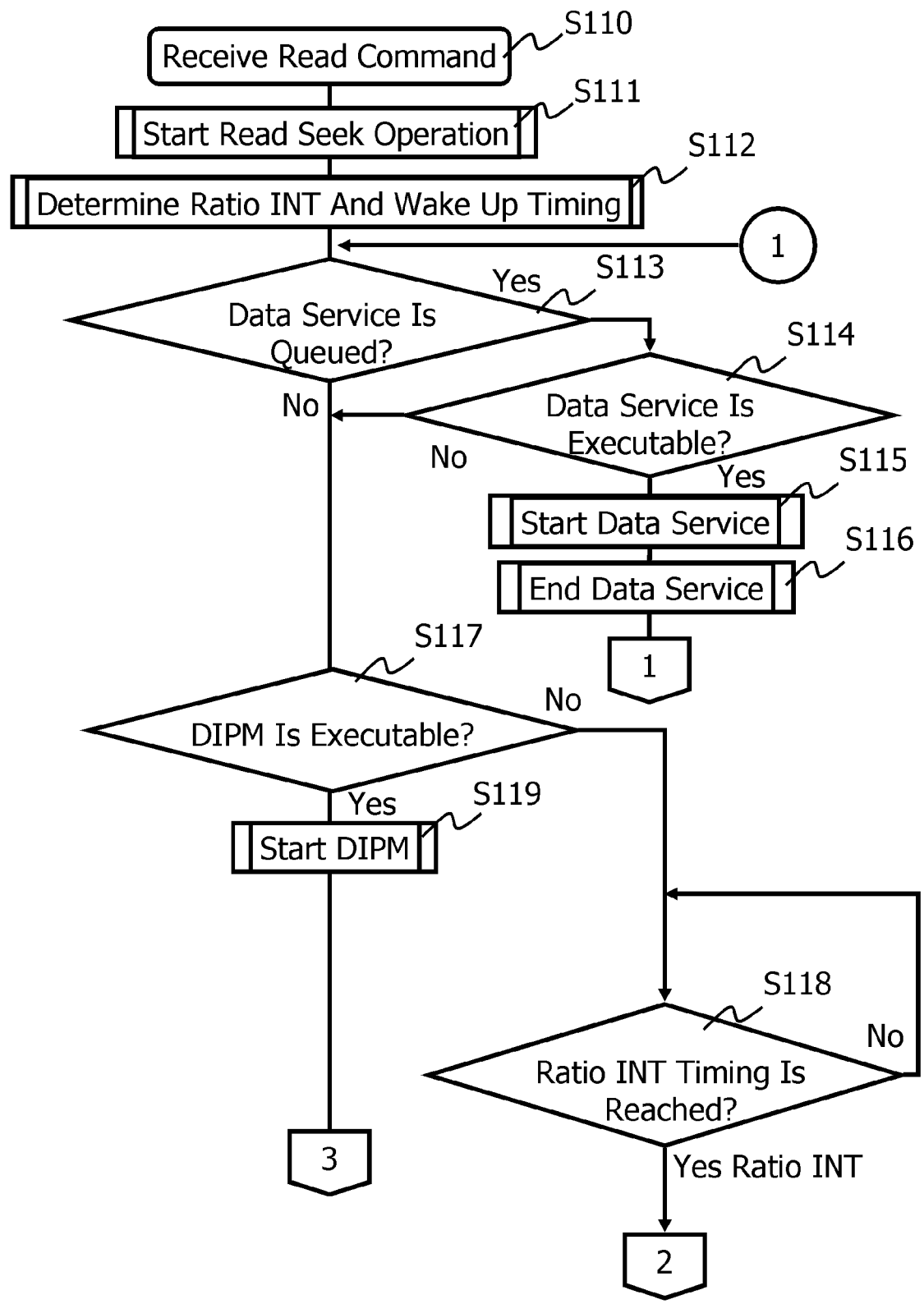
FIG. 11A and FIG. 11B illustrate an operation flow corresponding to the operation illustrated in FIG. 10A and FIG. 10B.
Figure 11B:
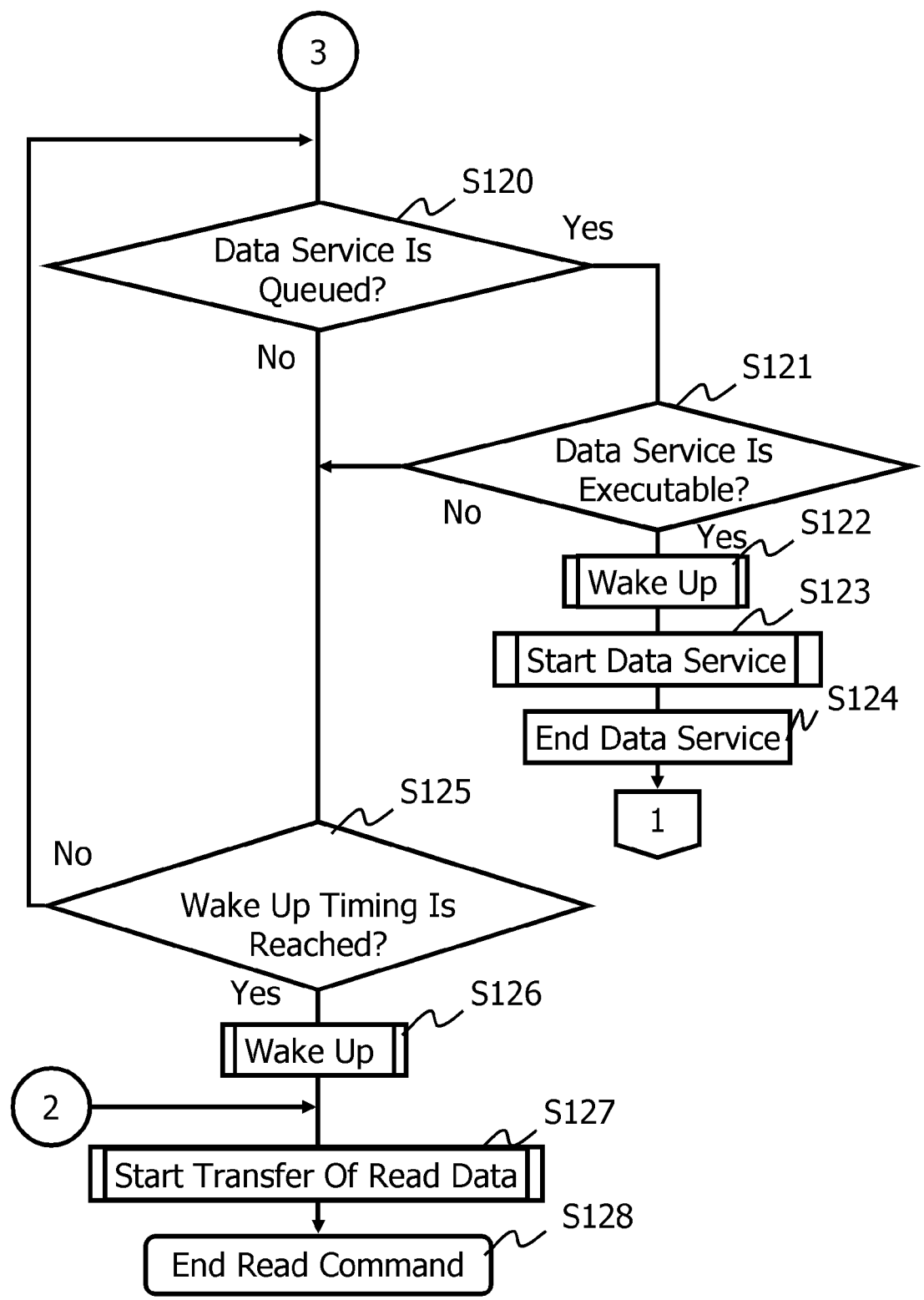
Figure 12:
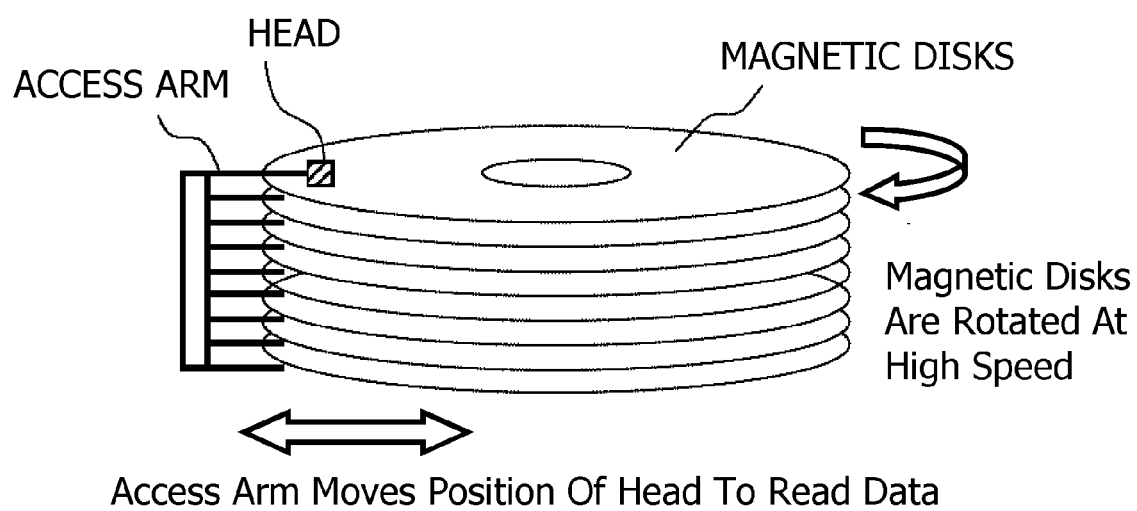
FIG. 12 illustrates the internal structure of the HDD.
Figure 13:
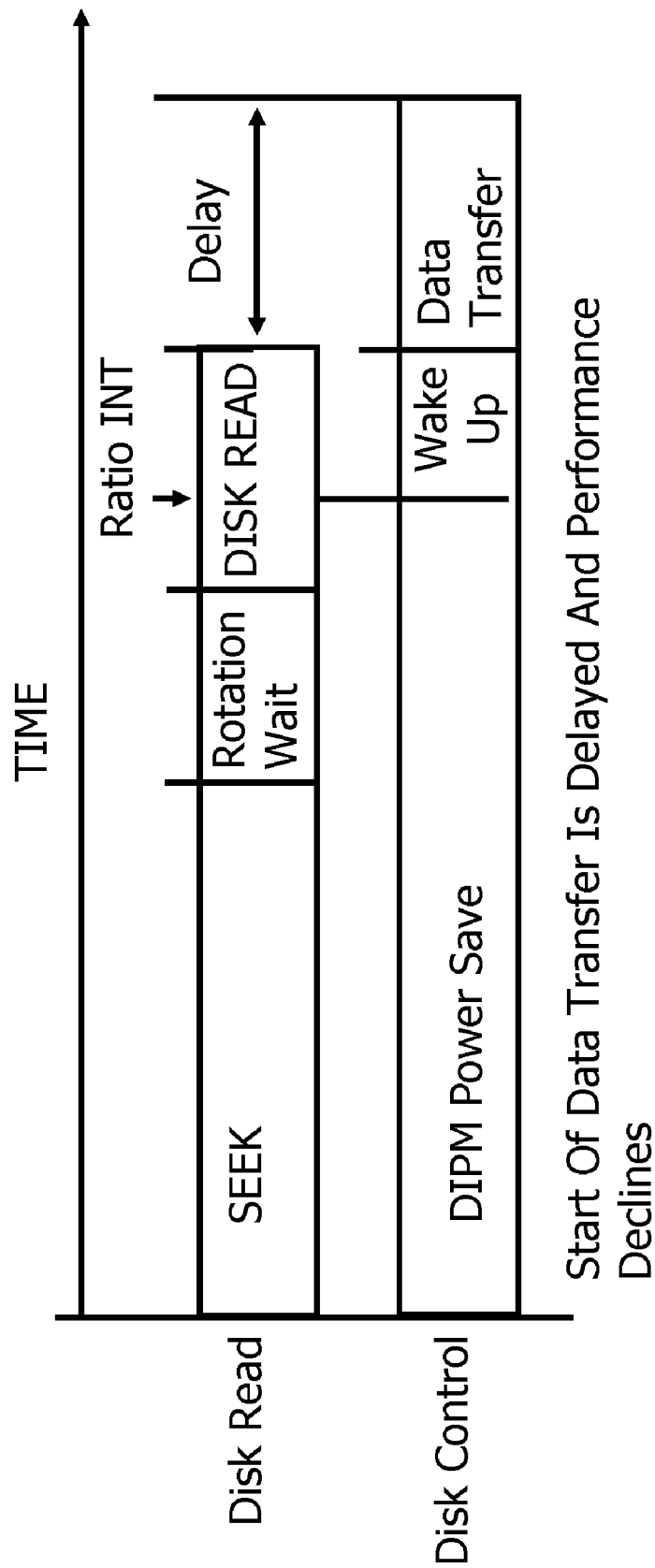
FIG. 13 illustrates an example of a decline in the performance of a read command.
Figure 14:
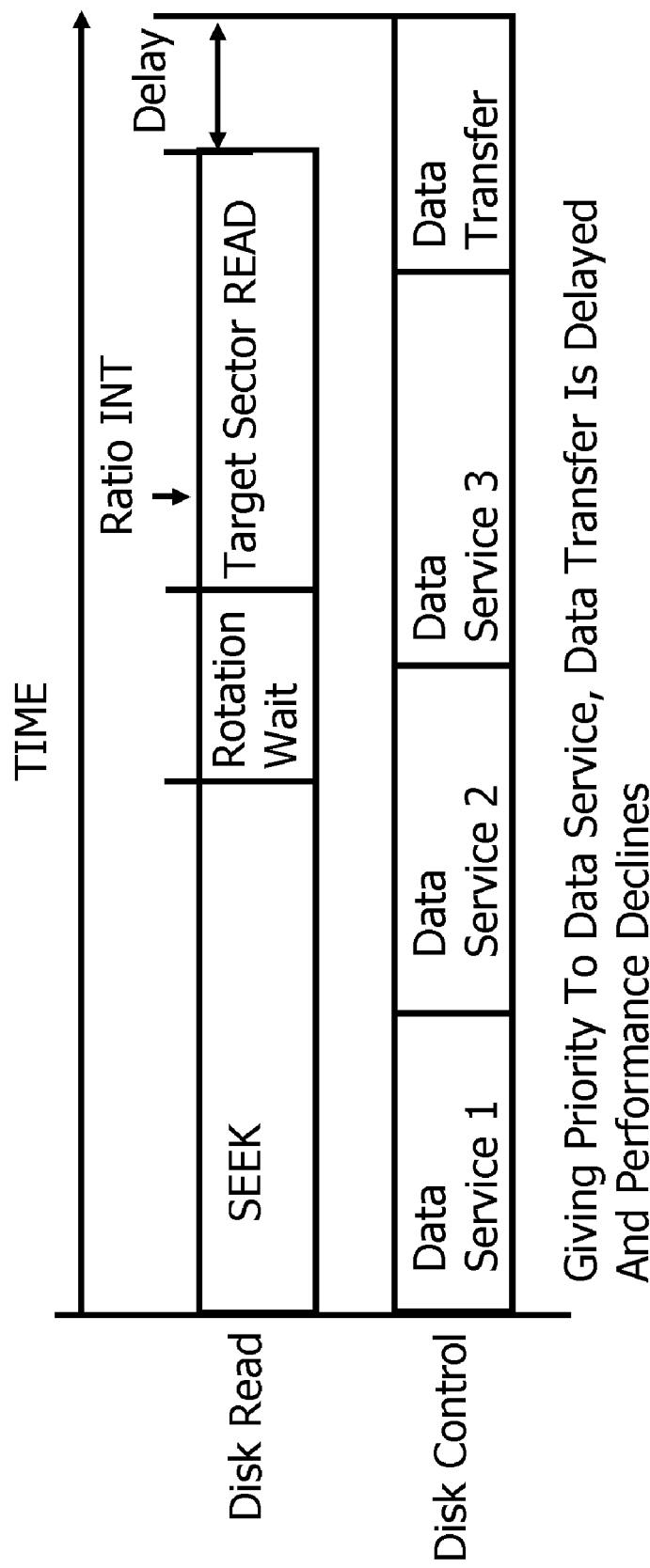
FIG. 14 illustrates an example of a decline in the performance of a read command based on NCQ.

FIG. 11A and FIG. 11B illustrate an operation flow of the HDD 1, the operation flow corresponding to the operation illustrated in FIG. 10A and FIG. 10B. First, in step S110, a read command is received from the host 17. In step S111, a read seek operation is started. In step S112, the timing determining module 21 determines the ratio INT timing and the wake up timing. In step S113, a determination is made as to whether or not any data service exists. When a data service exists (Y), the process proceeds to step S114, in which a determination is made as to whether or not the data service is executable. Detailed processing in this case is the same as that in step S74 in the second example. When the data service is executable (Y), the process proceeds to step S115, in which the execution of the data service is started. In step S116, the data service is completed, and the process returns to step S113.

When it is determined in step S114 that the data service is not executable (N), the process proceeds to step S117. In step S117, as in step S97 illustrated in FIG. 9, the DIPM controller 22 determines whether or not the controlling time for controlling DIPM power saving can be ensured before the ratio INT timing. When the controlling time cannot be ensured and the data service is not executable (N), the process proceeds to step S118. In step S118, a determination is made as to whether or not the ratio INT timing is reached. When the ratio INT timing is not reached (N), the bus keep is performed. When it is determined in step S118 that the ratio INT timing is reached (Y), the process proceeds to step S127.

When it is determined in step S117 that DIPM power saving is executable (Y), the process proceeds to step S119, in which the HDD 1 enters the power saving state. When an NCQ command is received during the power saving state, it is determined in step S120 that a data service exists (Y) and the process proceeds to step S121. In step S121, a determination is made as to whether or not the data service is executable. When the data service is executable (Y), the process proceeds to step S122, in which the HDD 1 wakes up. In step S123, the execution of the data service is started. Subsequently, in step S124, the data service is completed, and the process returns to step S113.

When it is determined in step S120 that no data service exists (N), the process proceeds to step S125, in which a determination is made as to whether or not the wake up timing is reached. When the wake up timing is not reached (N), the power saving state is maintained and the process returns to step S120. When it is determined in step S125 that the wake up timing is reached (Y), the process proceeds to step S126, in which the HDD 1 wakes up. In step S127, transfer of read data is started. In step S128, transfer of data for the read command is completed.

As described above, the HDD 1 according to the third example which has the DIPM controller 22 and the NCQ controller 23 can be applied to various cases and can minimize the power consumption without a decline in the performance of the HDD 1.

In the known DIPM power saving described above, there are cases in which the performance is sacrificed to reduce the power consumption, such as a case in which the start of transfer of data from the HDD in response to a read command is delayed. However, according to the HDD of the above described examples, the ratio INT timing is determined when the HDD receives a read command from the host and the HDD wakes up from the power saving state so that the determined ratio INT timing matches the data-transferable timing. Thus, it is possible to reduce the power consumption while efficiently maintaining the performance.

In addition, since an NCQ-command data service according to the known control operation is performed when the bus is not in use during a read seek operation, the known control operation is effective for an improvement in the performance but could instead reduce the performance if it is misused. According to the HDD of the above-described examples, however, when a read command is received from the host, the ratio INT timing is determined and the execution end time of a data service that is queued and the ratio INT timing are compared with each other. When the data service is executable before the ratio INT timing, the data service is executed. When the data service is not executable, the bus keep is performed without execution of the data service, so that the data transfer is started immediately at the ratio INT timing. Thus, the performance of the HDD does not decline.

In particular, for HDDs used for notebook computers, the power consumption and the performance are important factors. In the known technology, the performance tends to be sacrificed to reduce the power consumption. The present embodiment, however, makes it possible to reduce the power consumption without reducing the performance and is highly advantageous.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage device for storing data, comprising:
    an interface controller connectable to a host via an interface, the interface controller having an active state capable of transmitting data to the host and an inactive state having a lower power consumption than the active state;
    a medium for storing data;
    a head for reading out data stored in the medium; and
    a processor for executing a process comprising:
        receiving a command for reading out data stored in the medium from the host,
        determining timing when the data read out from the medium reaches the interface controller,
        detecting native-command-queuing command data service,
        determining whether to execute the data service during the preparation for reading the data from the medium,
        performing the data service when an execution end time of the data service is earlier than the determined timing,
        starting transition of the interface controller from the inactive state into the active state before the determined timing, and
        changing the interface for the host into a power saving state when the native-command-queuing command data service is not executed and it is determined on the basis of the determined timing that a time for putting the interface into the power saving state is available, and restoring the interface to a data transferable state according to the determined timing when the interface is in a power saving state in which the data is not transferable.

2. A method for controlling a storage device for storing data, the storage device including an interface controller connectable to a host via an interface, the interface controller having an active state capable of transmitting data to the host and an inactive state having a lower power consumption than the active state, a medium for storing data, and a head for reading out data stored in the medium, the method comprising:
    receiving a command for reading out data stored in the medium from the host;
    determining timing when the data read out from the medium reaches the interface controller;
    detecting native-command-queuing command data services;
    determining whether to execute the data service during the preparation for reading the data from the medium;
    performing the each data services when an execution end time of the data service is earlier than the determined timing;
    starting transition of the interface controller from the inactive state into the active state before the determined timing; and
    changing the interface for the host into a power saving state when the native-command-queuing command data service is not executed and it is determined on the basis of the determined timing that a time for putting the interface into the power saving state is available, and restoring the interface to a data transferable state according to the determined timing when the interface is in a power saving state in which the data is not transferable.

* * * * *